US011952071B2

(12) United States Patent
Hikosaka et al.

(10) Patent No.: US 11,952,071 B2
(45) Date of Patent: Apr. 9, 2024

(54) TWO-WHEELED VEHICLE LAMP TURN SIGNAL

(71) Applicant: KOITO MANUFACTURING CO., LTD., Tokyo (JP)

(72) Inventors: Riri Hikosaka, Shizuoka (JP); Yuji Ishihara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 128 days.

(21) Appl. No.: 17/615,733

(22) PCT Filed: May 27, 2020

(86) PCT No.: PCT/JP2020/020882
§ 371 (c)(1),
(2) Date: Dec. 1, 2021

(87) PCT Pub. No.: WO2020/246334
PCT Pub. Date: Dec. 10, 2020

(65) Prior Publication Data
US 2022/0234491 A1 Jul. 28, 2022

(30) Foreign Application Priority Data

Jun. 4, 2019 (JP) ................................ 2019-104262

(51) Int. Cl.
B62J 6/056 (2020.01)
B60Q 1/00 (2006.01)
(Continued)

(52) U.S. Cl.
CPC ............ *B62J 6/056* (2020.02); *B60Q 1/0041* (2013.01); *B60Q 1/381* (2022.05); *B62J 6/026* (2020.02); *B60Q 2900/40* (2022.05)

(58) Field of Classification Search
CPC ......... B62J 6/026; B62J 6/056; B60Q 1/0041; B60Q 1/381; B60Q 2900/40
See application file for complete search history.

(56) References Cited

U.S. PATENT DOCUMENTS 8,547,219 B2 * 10/2013 Kisiel .................... B60Q 1/448
340/471
2002/0057578 A1 * 5/2002 Kageyama ........ B29C 66/30223
362/267

(Continued)

FOREIGN PATENT DOCUMENTS

DE 102013217848 A1 3/2015
EP 3272632 A1 1/2018

(Continued)

OTHER PUBLICATIONS

Takunaga et al., Vehicular Direction Indicator, 2018, JP 2018034699 A, https://worldwide.espacenet.com/patent/search/family/061566816/publication/JP2018034699A?q=pn%3DJP2018034699A (Year: 2018).*

(Continued)

*Primary Examiner* — Tracie Y Green
*Assistant Examiner* — Michael Chiang
(74) *Attorney, Agent, or Firm* — Sughrue Mion, PLLC

(57) ABSTRACT

A first lamp unit and a second lamp unit arranged in a given direction are provided, luminous intensity of the second lamp unit in a lamp forward direction is set to be higher than luminous intensity of the first lamp unit in the lamp forward direction, and the first lamp unit and the second lamp unit are turned on sequentially with time difference. Thus, since the first lamp unit and the second lamp unit having different luminous intensity and being arranged in the given direction are turned on sequentially with time difference, it is visually recognized that emitted light flows from one side to the other, and the light is emitted from both the first lamp unit and the second lamp unit that has higher luminous intensity (Continued)

than that of the first lamp unit. Thus, it is possible to ensure high conspicuity in addition to improvement of functionality.

3 Claims, 2 Drawing Sheets

(51) Int. Cl.
*B60Q 1/38* (2006.01)
*B62J 6/026* (2020.01)

(56) References Cited

U.S. PATENT DOCUMENTS

| | | | |
|---|---|---|---|
| 2005/0128761 A1* | 6/2005 | Wu | B60Q 1/32 |
| | | | 362/543 |
| 2006/0114108 A1 | 6/2006 | Counts | |
| 2009/0051522 A1* | 2/2009 | Perkins | B60Q 1/2603 |
| | | | 362/545 |
| 2013/0127340 A1* | 5/2013 | Huhn | B60Q 1/382 |
| | | | 315/77 |
| 2016/0046340 A1 | 2/2016 | Oguchi | |
| 2018/0057091 A1* | 3/2018 | Kuriki | B60Q 1/34 |
| 2021/0078484 A1 | 3/2021 | Fujii et al. | |

FOREIGN PATENT DOCUMENTS

| | | | | |
|---|---|---|---|---|
| JP | 47-035770 U | | 12/1972 | |
| JP | 2018-034699 A | | 3/2018 | |
| JP | 2018034669 A | * | 3/2018 | ......... B60C 11/0304 |
| WO | 2014/157353 A1 | | 10/2014 | |
| WO | 2016/001936 A2 | | 1/2016 | |
| WO | 2016/148234 A1 | | 9/2016 | |
| WO | 2019/044404 A1 | | 3/2019 | |

OTHER PUBLICATIONS

Extended European Search Report dated Jun. 30, 2022 from the European Patent Office in EP Application No. 20818959.7.
International Search Report of PCT/JP2020/020882 dated Jul. 28, 2020 [PCT/ISA/210].
Written Opinion of PCT/JP2020/020882 dated Jul. 28, 2020 [PCT/ISA/237].

* cited by examiner

TWO-WHEELED VEHICLE LAMP TURN SIGNAL

CROSS REFERENCE TO RELATED APPLICATIONS

This application is a National Stage of International Application No. PCT/JP2020/020882 filed on May 27, 2020, claiming priority based on Japanese Patent Application No. 2019-104262 filed on Jun. 4, 2019.

TECHNICAL FIELD

The invention relates to a technical field regarding a two-wheeled vehicle lamp that is used for a two-wheeled vehicle such as a motorcycle.

BACKGROUND ART

As a two-wheeled vehicle lamp having a lamp unit used as a turn signal lamp in a two-wheeled vehicle such as a motorcycle, there is a so-called sequential-type two-wheeled vehicle lamp in which a plurality of light sources that emit light is arranged, and the light is emitted from the light sources sequentially with time difference in an alignment direction of the light sources (for example, see Patent Document 1).

With this type of two-wheeled vehicle lamp, it is visually recognized that the light flows from one side to the other in the alignment direction of the light sources, and high functionality is thus secured.

Patent Document 1: WO2019/44404

Incidentally, even in a state where the above-described sequential function is performed, it is desirable that high conspicuity should be ensured by emission of sufficiently bright light. Unlike a body of a four-wheeled vehicle such as an automobile, a body of a two-wheeled vehicle is particularly small, and a space where a two-wheeled vehicle lamp is attached in the body of the two-wheeled vehicle is also small. Therefore, the number and arrangement positions of the light sources provided in the two-wheeled vehicle lamp tend to be limited, and high conspicuity may not be ensured depending on a light emission state.

An object of the invention is to ensure high conspicuity as well as improvement of functionality.

SUMMARY OF THE INVENTION

First, a two-wheeled vehicle lamp according to the invention includes a first lamp unit and a second lamp unit arranged in a given direction. Luminous intensity of the second lamp unit in a lamp forward direction is set to be higher than luminous intensity of the first lamp unit in the lamp forward direction, and the first lamp unit and the second lamp unit are turned on sequentially with time difference.

Thus, the first lamp unit and the second lamp unit having different luminous intensity and being arranged in the given direction are tuned on sequentially with time difference.

Secondly, in the two-wheeled vehicle lamp according to the invention described above, it is desirable that a plurality of first light sources should be provided to be arranged in the given direction in the first lamp unit, and the plurality of first light sources should be turned on in order of an arrangement with time difference.

Therefore, since the first light sources and the second lamp unit are turned on in order of the arrangement with time difference, it is visually recognized that light emitted from the plurality of first light sources and the second lamp unit flows from one side to the other.

Third, in the two-wheeled vehicle lamp according to the invention described above, it is desirable that a plurality of second light sources should be provided in the second lamp unit, and the plurality of second light sources should be turned on and off simultaneously.

Thus, when the plurality of second light sources is turned on, luminous intensity of the second lamp unit becomes high.

Fourth, in the two-wheeled vehicle lamp according to the invention described above, it is desirable that a third lamp unit having at least one third light source should be provided, and the second lamp unit should be positioned outward of the third lamp unit in a right-left direction.

Thus, luminous intensity of light emitted from a position outward of the third lamp unit in the right-left direction becomes higher, and it is thus less likely that a rider blocks the light with high luminous intensity.

Fifth, in the two-wheeled vehicle lamp according to the invention described above, it is desirable that the first lamp unit should be positioned above or below the third lamp unit.

Therefore, the second lamp unit is positioned outward of the third lamp unit in the right-left direction, and the first lamp unit arranged with the second lamp unit in the given direction is positioned above or below the third lamp unit.

Sixth, in the two-wheeled vehicle lamp according to the invention described above, it is desirable that an irradiation angle of light emitted from the first lamp unit should be set to be larger than an irradiation angle of light emitted from the second lamp unit.

Thus, the light emitted from the first lamp unit illuminates a region in a wide range, and the light emitted from the second lamp unit with luminous intensity higher than that of the first lamp unit brightly illuminates a region in a narrow range.

According to the invention, since the first lamp unit and the second lamp unit that have different luminous intensity and are arranged in the given direction are turned on sequentially with time difference, it is visually recognized that the emitted light flows from one side to the other, and the light is emitted from both the first lamp unit and the second lamp unit that has higher luminous intensity than that of the first lamp unit. Thus, it is possible to ensure high conspicuity in addition to improvement of functionality.

MODES FOR CARRYING OUT THE INVENTION

Hereinafter, description is given of modes for carrying out a two-wheeled vehicle lamp according to the invention with reference to the attached drawings.

A two-wheeled vehicle lamp 1 is used as a so-called combination lamp that functions as, for example, both a turn signal lamp and a head lamp, and is arranged in and attached to, for example, a central portion of a front end portion of a vehicle body in a right-left direction.

The two-wheeled vehicle lamp 1 may be arranged in, for example, a rear end portion of the vehicle body as a combination lamp. When the two-wheeled vehicle lamp 1 is arranged in the rear end portion of the vehicle body, one two-wheeled vehicle lamp 1 may be arranged in the central portion in the right-left direction, or two two-wheeled vehicle lamps 1 may be arranged separately from each other on the right side and the left side, respectively. When the two-wheeled vehicle lamp 1 is arranged in the rear end portion of the vehicle body, the two-wheeled vehicle lamp 1 is used as a combination lamp in which the turn signal lamp is combined with other lamps such as a stop lamp and a tail lamp.

Figure 1:
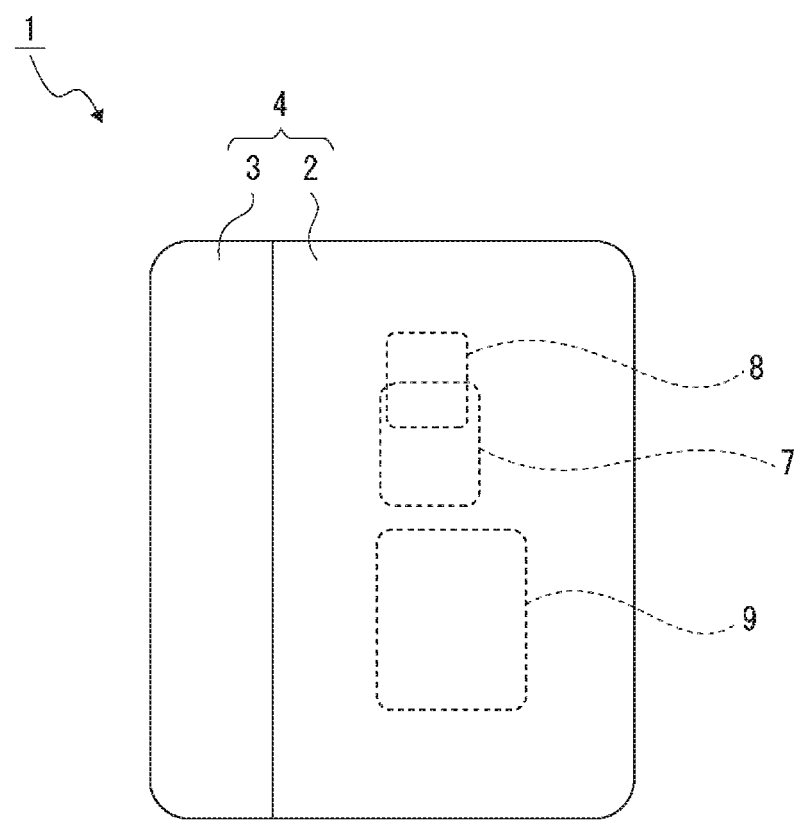
FIG. 1 shows an embodiment of a two-wheeled vehicle lamp according to the invention together with FIG. 2 and FIG. 3, and is a schematic side view of the two-wheeled vehicle lamp.
Figure 2:
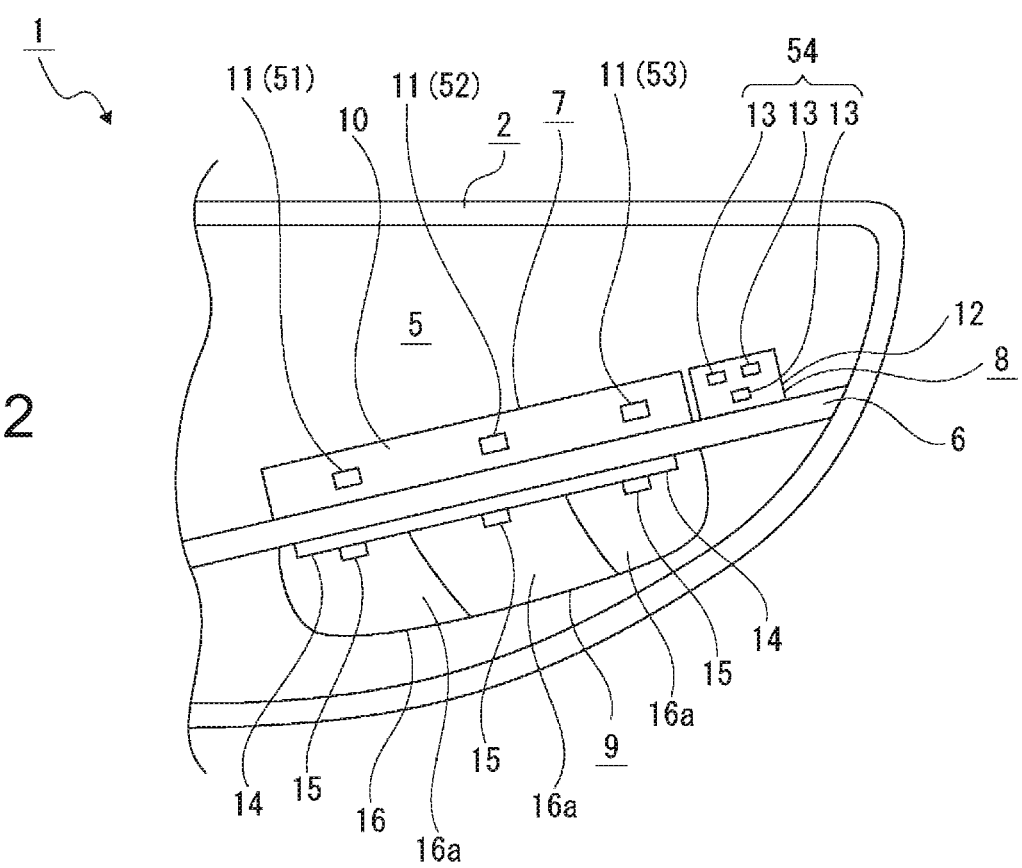
FIG. 2 is a schematic front view of the two-wheeled vehicle lamp shown in a state where a cover is removed.

The two-wheeled vehicle lamp 1 includes a lamp housing 2 having a recessed portion that is open to the front, and a cover 3 that closes the opening of the lamp housing 2 (see FIG. 1 and FIG. 2). The two-wheeled vehicle lamp 1 is, for example, formed into symmetrical shape and structure, and FIG. 2 shows a half of the two-wheeled vehicle lamp 1 in the right-left direction.

The lamp housing 2 and the cover 3 form a lamp external case 4. An internal space of the lamp external case 4 is formed as a lamp chamber 5.

The lamp housing 2 is provided with an arrangement plate portion 6 that is arranged to face an upper-lower direction at a location that separates the lamp chamber 5 into an upper part and a lower part. In the lamp chamber 5, an unillustrated control circuit is arranged, and the control circuit is connected with an unillustrated power supply circuit.

In the lamp chamber 5, a first lamp unit 7, a second lamp unit 8, and a third lamp unit 9 are arranged.

The first lamp unit 7 is, for example, arranged on top of the arrangement plate portion 6, and is formed into a laterally-long shape. The first lamp unit 7 is a lamp unit that functions as a turn signal lamp, and includes, for example, a laterally-long first substrate 10 directed along a front-rear direction, and first light sources 11, 11, 11 mounted on a front surface of the first substrate 10. At least one first light source 11 may be provided. The first light sources 11, 11, 11 are provided as a first light emitting part 51, a second light emitting part 52, and a third light emitting part 53 in this order from an inner side in the right-left direction.

In the first lamp unit 7, unillustrated light control members such as a reflector and an inner lens may be arranged in front of the first light sources 11, 11, 11, and the light control members may control an irradiation direction of light emitted from the first light sources 11, 11, 11.

The first light sources 11, 11, 11 are positioned apart from each other in a given direction, for example, in a substantially right-left direction. As the first light source 11, for example, an LED (light emitting diode) is used. The light emitted from the first light source 11 penetrates the cover 3 and is emitted forward or diagonally forward.

The second lamp unit 8 is arranged, for example, on top of the arrangement plate portion 6, and positioned alongside the first lamp unit 7 in the substantially right-left direction. The second lamp unit 8 is a lamp unit that functions as a turn signal lamp together with the first lamp unit 7, and is positioned outward of the first lamp unit 7 in the substantially right-left direction with respect to the center of the two-wheeled vehicle lamp 1 in the right-left direction. The second lamp unit 8 includes, for example, a second substrate 12 directed in the front-rear direction, and second light sources 13, 13, 13 mounted on a front surface of the second substrate 12. At least one second light source 13 may be provided. The second light sources 13, 13, 13 are provided as a fourth light emitting part 54 as a whole.

In the second lamp unit 8, unillustrated light control members such as a reflector and an inner lens may be arranged in front of the second light sources 13, 13, 13, and the light control members may control an irradiation direction of light emitted from the second light sources 13, 13, 13.

As the second light source 13, for example, an LED is used. The light emitted from the second light source 13 penetrates the cover 3 and is emitted forward.

The third lamp unit 9 is arranged, for example, underneath the arrangement plate portion 6, and formed into a laterally-long shape. The third lamp unit 9 is a lamp unit that functions as a head lamp, and is positioned below the first lamp unit 7.

The third lamp unit 9 includes, for example, a laterally-long third substrate 14 directed in a substantially front-rear direction, third light sources 15, 15, 15 mounted on a lower surface of the third substrate 14, and a reflector 16 arranged at a position corresponding to the third light sources 15, 15, 15. At least one third light source 15 may be provided.

The third substrate 14 is attached to, for example, a lower surface of the arrangement plate portion 6. The third light sources 15, 15, 15 are positioned apart from each other in the substantially right-left direction. In the reflector 16, reflection surfaces 16a, 16a, 16a aligned in the right-left direction are formed.

As the third light source 15, for example, an LED is used. Light emitted from the third light sources 15, 15, 15 is reflected by the reflection surfaces 16a, 16a, 16a of the reflector 16, respectively, penetrates the cover 3, and is emitted forward.

As described above, the third lamp unit 9 is positioned below the first lamp unit 7, and the first lamp unit 7 and the third lamp unit 9 are respectively positioned on the upper side and the lower side of the arrangement plate portion 6. Therefore, the first lamp unit 7 is positioned above the third lamp unit 9, and the second lamp unit 8 is positioned outward of the third lamp unit 9 in the right-left direction.

Although FIG. 2 shows an example where the first lamp unit 7, the second lamp unit 8, and the third lamp unit 9 as a whole are inclined so as to be displaced upwardly with respect to the right-left direction towards the outer side in the right left direction, the first lamp unit 7, the second lamp unit 8, and the third lamp unit 9 as a whole may be inclined so as to be displaced downwardly with respect to the right-left direction towards the outer side in the right-left direction. Also, the first lamp unit 7, the second lamp unit 8, and the third lamp unit 9 as a whole may be arranged in a state where the right-left direction is a longitudinal direction.

In the two-wheeled vehicle lamp 1 configured as describe above, luminous intensity of the second lamp unit 8 is set to be higher than luminous intensity of the first lamp unit 7. Specifically, the luminous intensity (HV luminous intensity) of the second lamp unit 8 in the forward direction with respect to the lamp is set to be higher than that of the first lamp unit 7. In the two-wheeled vehicle lamp 1, when HV luminous intensity obtained by adding the HV luminous intensity of the first lamp unit 7 to the HV luminous intensity of the second lamp unit 8 is 100%, for example, the HV luminous intensity of the first lamp unit 7 is set to approximately 2%, and the HV luminous intensity of the second lamp unit 8 is set to approximately 98%.

In the two-wheeled vehicle lamp 1, it is possible to set the HV luminous intensity of the second lamp unit 8 to be higher than the HV luminous intensity of the first lamp unit 7 by, for example, use of the first light sources 11, 11, 11 and the second light sources 13, 13, 13, that are different in kind from each other, and setting of a current value for the first light sources 11, 11, 11 to be smaller than a current value for the second light sources 13, 13, 13. Meanwhile, it is also possible to set the HV luminous intensity of the second lamp unit 8 to be higher than the HV luminous intensity of the first lamp unit 7 by use of the first light sources 11, 11, 11 and the second light sources 13, 13, 13 that are the same in kind, and setting of an irradiation direction (a light axis direction) of the light emitted from the first light sources 11, 11, 11 to be different from an irradiation direction (a light axis direction) of the light emitted from the second light sources 13, 13, 13.

A control circuit controls on and off of the first lamp unit 7, the second lamp unit 8, and the third lamp unit 9. Since the first lamp unit 7 and the second lamp unit 8 function as a turn signal lamp, and the third lamp unit 9 functions as a head lamp, the on-off of the third lamp unit 9 is controlled independently from the first lamp unit 7 and the second lamp unit 8, and the on-off of the first lamp unit 7 and the on-off of the second lamp unit 8 are controlled in conjunction with each other.

In the first lamp unit 7 and the second lamp unit 8, the on-off of the first light emitting part 51, the second light emitting part 52, the third light emitting part 53, and the fourth light emitting part 54 is performed with time difference according to the order of the arrangement, and, therefore, so-called sequential on-off control is performed.

Specifically, the first light emitting part 51, the second light emitting part 52, the third light emitting part 53, and the fourth light emitting part 54 are turned on sequentially. First, only the first light emitting part 51 is turned on, and, when the second light emitting part 52 is turned on, the first light emitting part 51 is in a lighted state. When the third light emitting part 53 is turned on, the first light emitting part 51 and the second light emitting part 52 are in the lighted state. When the fourth light emitting part 54 is turned on, the first light emitting part 51, the second light emitting part 52, and the third light emitting part 53 are in the lighted state. When a given period of time passes after the first light emitting part 51, the second light emitting part 52, the third light emitting part 53, and the fourth light emitting part 54 are turned on, the first light emitting part 51, the second light emitting part 52, the third light emitting part 53, and the fourth light emitting part 54 are turned off simultaneously.

In the two-wheeled vehicle lamp 1, the on-off of the first light emitting part 51, the second light emitting part 52, the third light emitting part 53, and the fourth light emitting part 54 in the above-described order is performed repeatedly.

Because the above-described light control is performed, the light emitted from the first lamp unit 7 and the second lamp unit 8 with time difference is emitted sequentially in the right-left direction, and it is visually recognized that the emitted light flows from one side to the other, and attention of a viewer is thus drawn easily. At this time, light with higher luminous intensity than the luminous intensity of the first lamp unit 7 is emitted from the second lamp unit 8, and high conspicuity is ensured especially by the light emitted from the second lamp unit 8. Therefore, the viewer recognizes from the turn signal lamp that a moving direction of the two-wheeled vehicle may be changing to the right or the left. Thus, sufficient warning function is achieved as the turn signal lamp.

As described so far, the two-wheeled vehicle lamp 1 includes the first lamp unit 7 and the second lamp unit 8 arranged in the given direction, the luminous intensity of the second lamp unit 8 in the lamp forward direction is higher than the luminous intensity of the first lamp unit 7 in the lamp forward direction, and the first lamp unit 7 and the second lamp unit 8 are turned on sequentially with time difference.

Therefore, because the first lamp unit 7 and the second lamp unit 8 having different luminous intensity and arranged in the given direction are turned on sequentially with time difference, it is visually recognized that the emitted light flows from one side to the other, and light is emitted from both the first lamp unit 7 and the second lamp unit 8 that has higher luminous intensity than that of the first lamp unit 7. Thus, high conspicuity is ensured in addition to improvement of functionality.

Further, the first light sources 11, 11, 11 are provided 7 in the given direction in the first lamp unit, and the first light sources 11, 11, 11 are turned on in the order of the arrangement with time difference.

Therefore, since the first light sources 11, 11, 11 and the second lamp unit 8 are turned on in the order of the arrangement with time difference, it is visually recognized that the light emitted from the first light sources 11, 11, 11 and the second lamp unit 8 flows from one side to the other. Thus, it is possible to easily attract attention of a viewer, to improve functionality, and to ensure high conspicuity more reliably.

Further, the second light sources 13, 13, 13 are provided in the second lamp unit 8, and the second light sources 13, 13, 13 are turned on and off simultaneously.

Therefore, when the plurality of second light sources 13, 13, 13 is turned on, the luminous intensity of the second lamp unit 8 becomes high. Thus, it is possible to easily set a state where the luminous intensity of the second lamp unit 8 is higher than the luminous intensity of the first lamp unit 7, and it is possible to achieve improvement of conspicuity of the entire two-wheeled vehicle lamp 1 due to the high luminous intensity of the second lamp unit 8.

Furthermore, the third lamp unit 9 having at least one third light source 15 is provided, and the second lamp unit 8 is positioned outward of the third lamp unit 9 in the right-left direction.

Therefore, the luminous intensity of the light emitted from the position outward of the third lamp unit 9 in the right-left direction is high, and it becomes less likely that a rider blocks the light with high luminous intensity, thereby achieving higher improvement of conspicuity.

Additionally, since the first lamp unit 7 is positioned above the third lamp unit 9, the second lamp unit 8 is positioned outward of the third lamp unit 9 in the right-left direction, and the first lamp unit 7 arranged with the second lamp unit 8 in the given direction is positioned above the third lamp unit 9.

Therefore, it is possible to ensure that the size of the two-wheeled vehicle lamp 1 in the right-left direction is reduced, to ensure a sufficient size of the first lamp unit 7 in the right-left direction, and to ensure high functionality of the first lamp unit 7 and the second lamp unit 8 that are turned on sequentially with time difference.

In the foregoing, the example was described where the first light emitting part 51, the second light emitting part 52, the third light emitting part 53, and the fourth light emitting part 54 are turned on sequentially. However, in the two-wheeled vehicle lamp 1, the fourth light emitting part 54 may be turned on simultaneously with another light emitting part. For example, the fourth light emitting part 54 may be turned on simultaneously with the third light emitting part 53. In this case, after the first light emitting part 51 and the second light emitting part 52 are turned on sequentially, the third light emitting part 53 and the fourth light emitting part 54 are turned on simultaneously, and thus sequential on-off control is performed.

Figure 3:
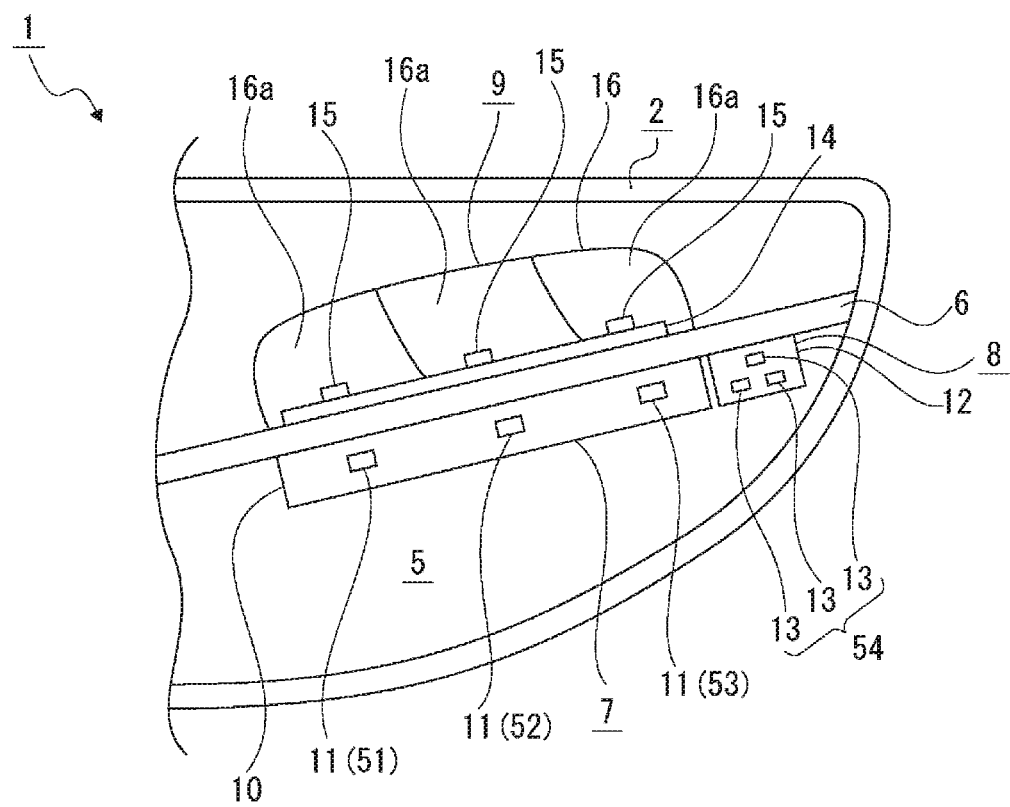
FIG. 3 is a schematic front view of a two-wheeled vehicle lamp, showing another structure in the state where the cover is removed.

In the foregoing, the example was described where the first lamp unit 7 is positioned above the third lamp unit 9. However, to the contrary, the first lamp unit 7 may be positioned below the third lamp unit 9 (see FIG. 3). In FIG. 3, a half of the two-wheeled vehicle lamp 1 in the right-left direction is also shown.

In this case, the third lamp unit 9 is positioned above the first lamp unit 7, and the third lamp unit 9 and the first lamp unit 7 are respectively positioned on the upper side and the lower side of the arrangement plate portion 6. Further, the second lamp unit 8 is positioned outward of the third lamp unit 9 in the right-left direction in a state where the second lamp unit 8 is arranged with the first lamp unit 7.

As described above, when the first lamp unit 7 is positioned below the third lamp unit 9, the second lamp unit 8 is positioned outward of the third lamp unit 9 in the right-left direction, and the first lamp unit 7 arranged with the second lamp unit 8 in the given direction is positioned below the third lamp unit 9.

Therefore, it is possible to ensure that the size of the two-wheeled vehicle lamp 1 in the right-left direction is reduced, to ensure a sufficient size of the first lamp unit 7 in the right-left direction, and to ensure high functionality of the first lamp unit 7 and the second lamp unit 8 that are turned on sequentially with time difference.

In the two-wheeled vehicle lamp 1, an irradiation angle of the light emitted from the first lamp unit 7 and an irradiation angle of the light emitted from the second lamp unit 8 may be different angles. For example, the irradiation angle of the light emitted from the first lamp unit 7 can be set to be larger than the irradiation angle of the light emitted from the second lamp unit 8.

By setting the irradiation angle of the light emitted from the first lamp unit 7 to be larger than the irradiation angle of the light emitted from the second lamp unit 8, a region in a wide range can be illuminated by the light emitted from the first lamp unit 7, and a region in a narrow range can be brought into a brightly-illuminated state by the light emitted from the second lamp unit 8 having higher luminous intensity than that of the first lamp unit 7. Therefore, it is possible to ensure high functionality achieved by illumination of a region in a wide range, and to ensure high conspicuity due to the light with high luminous intensity.

In addition, by setting the irradiation angle of the light emitted from the first lamp unit 7 to be larger than the irradiation angle of the light emitted from the second lamp unit 8, the HV luminous intensity of the first lamp unit 7 may be set to be lower than the HV luminous intensity of the second lamp unit 8. In this case, for example, a light control member such as a reflector may be provided, and, with the control by the light control member, it is possible to set the HV luminous intensity of the first lamp unit 7 to be lower than the HV luminous intensity of the second lamp unit 8.

As the irradiation angle of the light emitted from the first lamp unit 7 is set to be larger, the luminous intensity of the light emitted from the first lamp unit 7 is lowered in the forward direction, and the luminous intensity becomes higher on an oblique side. Therefore, a sequential light emitting state is visually recognized clearly even from the oblique side, and it is thus possible to ensure high conspicuity in a wide range.

Further, when the irradiation angle of the light emitted from the first lamp unit 7 is set to be large than the irradiation angle of the light emitted from the second lamp unit 8 as described above, an emitting direction of the light from the first light sources 11, 11, 11 and an emitting direction of the light from the second light sources 13, 13, 13 can be set to be different from each other.

In the foregoing, the example was given where the two-wheeled vehicle lamp 1 is used as a turn signal lamp. However, the two-wheeled vehicle lamp 1 may be applied as, for example, a welcome lamp that is turned on in a sequential light emitting state when a rider of the two-wheeled vehicle approaches a vehicle body.

DESCRIPTION OF SYMBOLS 1 two-wheeled vehicle lamp
7 first lamp unit
8 second lamp unit
9 third lamp unit
11 first light source
13 second light source
15 third light source

The invention claimed is:

1. A two-wheeled vehicle lamp comprising a first lamp unit and a second lamp unit arranged in a given direction, wherein:
   luminous intensity of the second lamp unit in a lamp forward direction is set to be higher than luminous intensity of the first lamp unit in the lamp forward direction; and
   the first lamp unit and the second lamp unit are turned on sequentially with time difference;
   a plurality of first light sources is provided to be arranged in the given direction in the first lamp unit;
   the plurality of first light sources is turned on in order of an arrangement with time difference; and
   the second lamp unit is positioned outward of the first lamp unit in a right-left direction;
   a third lamp unit having a plurality of third light sources is provided;
   the second lamp unit is positioned outward of the third lamp unit in a right-left direction; and
   the first lamp unit is positioned above or below the third lamp unit.

2. The two-wheeled vehicle lamp according to claim 1, wherein:
   a plurality of second light sources is provided in the second lamp unit; and
   the plurality of second light sources is turned on and off simultaneously.

3. The two-wheeled vehicle lamp according to claim 1, wherein an irradiation angle of light emitted from the first lamp unit is set to be larger than an irradiation angle of light emitted from the second lamp unit.

* * * * *